United States Patent [19]

Van Der Wal et al.

[11] Patent Number: 4,563,858
[45] Date of Patent: Jan. 14, 1986

[54] METHOD OF MATERIAL DISTRIBUTION AND APPARATUS FOR USE IN THE METHOD

[75] Inventors: Jan Van Der Wal, Rotterdam, Netherlands; Gerardus L. Nederpel, Sanderstead, United Kingdom

[73] Assignee: NAT Shipping Bagging Services Limited, Bermuda

[21] Appl. No.: 386,064

[22] Filed: Jun. 7, 1982

[30] Foreign Application Priority Data

Jun. 10, 1981 [GB] United Kingdom ................ 8117753

[51] Int. Cl.⁴ ........................ B65B 51/07; B65B 7/02; B65B 1/04
[52] U.S. Cl. ..................................... 53/418; 53/139; 53/502; 414/139
[58] Field of Search ........................ 53/418, 139, 502; 414/139, 143, 269, 271, 272

[56] References Cited

U.S. PATENT DOCUMENTS

| | | |
|---|---|---|
| 2,303,140 | 11/1942 | Sackett . |
| 2,378,920 | 6/1945 | Gillican ................................. 53/418 |
| 2,757,894 | 8/1956 | Kindseth ........................... 53/418 X |
| 2,853,842 | 9/1958 | Vredenburg . |
| 3,058,272 | 10/1962 | Huber ............................... 53/139 X |
| 3,149,733 | 9/1964 | Joyce .................................. 414/143 |
| 3,314,557 | 4/1967 | Sackett, Sr. ......................... 414/269 |
| 3,319,807 | 5/1967 | Van Raden ......................... 414/269 |

FOREIGN PATENT DOCUMENTS

| | | |
|---|---|---|
| 2062404 | 6/1971 | France . |
| 453883 | 9/1936 | United Kingdom . |
| 643588 | 9/1950 | United Kingdom . |
| 646109 | 11/1950 | United Kingdom . |
| 917690 | 2/1963 | United Kingdom . |
| 979586 | 1/1965 | United Kingdom . |
| 1007366 | 10/1965 | United Kingdom . |
| 1054577 | 1/1967 | United Kingdom . |
| 1103673 | 2/1968 | United Kingdom . |

Primary Examiner—Willie G. Abercrombie
Attorney, Agent, or Firm—Roylance, Abrams, Berdo & Goodman

[57] ABSTRACT

A method of material distribution for distributing free-flowing material is provided which consists of transporting the material in bulk from one location to another, siting a mobile bagging apparatus at the second location, unloading the transported material into the bagging apparatus, and bagging the material for use. In a preferred arrangement the mobile bagging apparatus has a receiving hopper for material, a weighing and bagging machine for metering the material into bags in predetermined quantities by weight, and a stitching machine for closing the bags. The material is suitably transported in bulk by transport ship.

8 Claims, 8 Drawing Figures

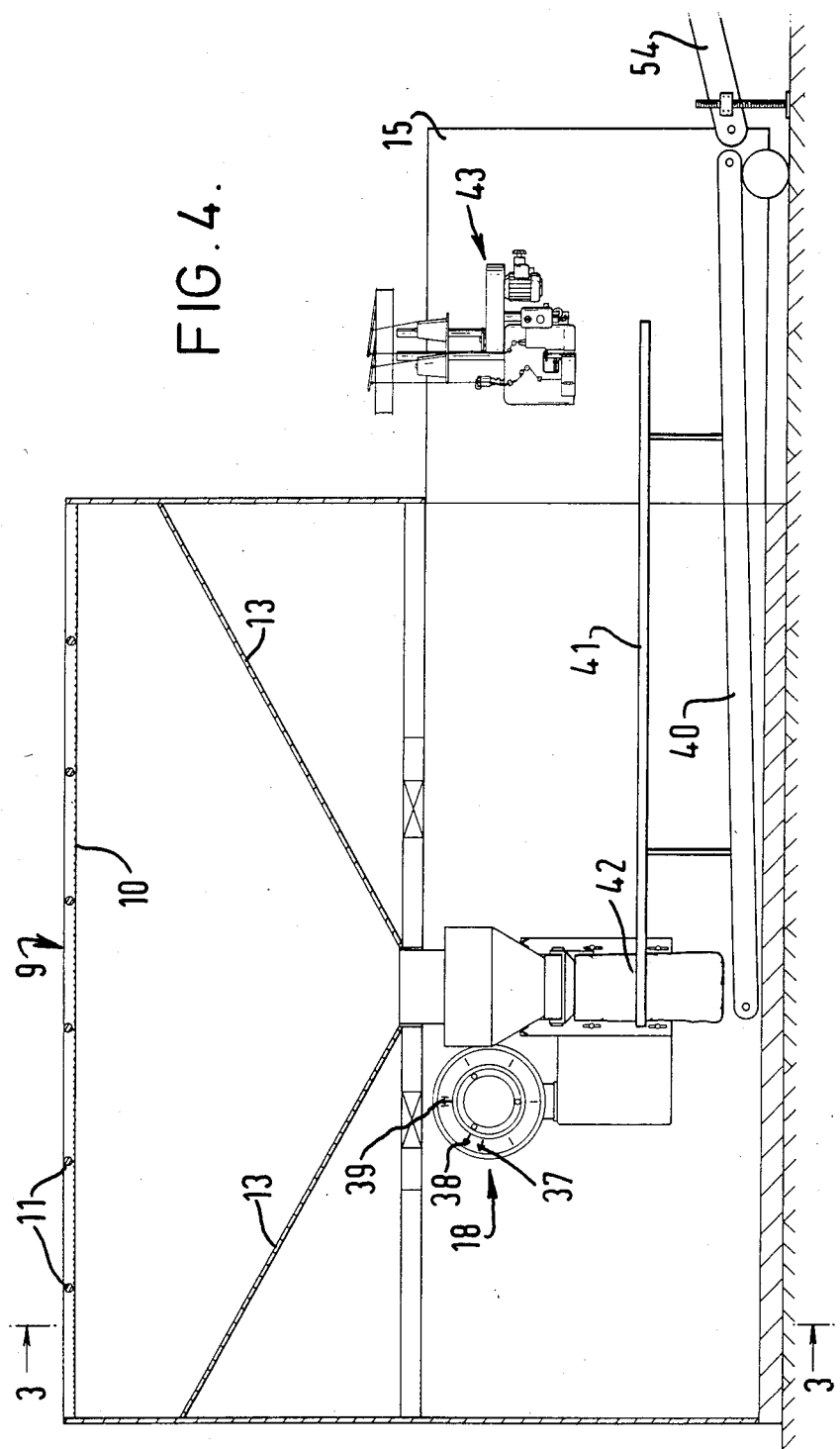

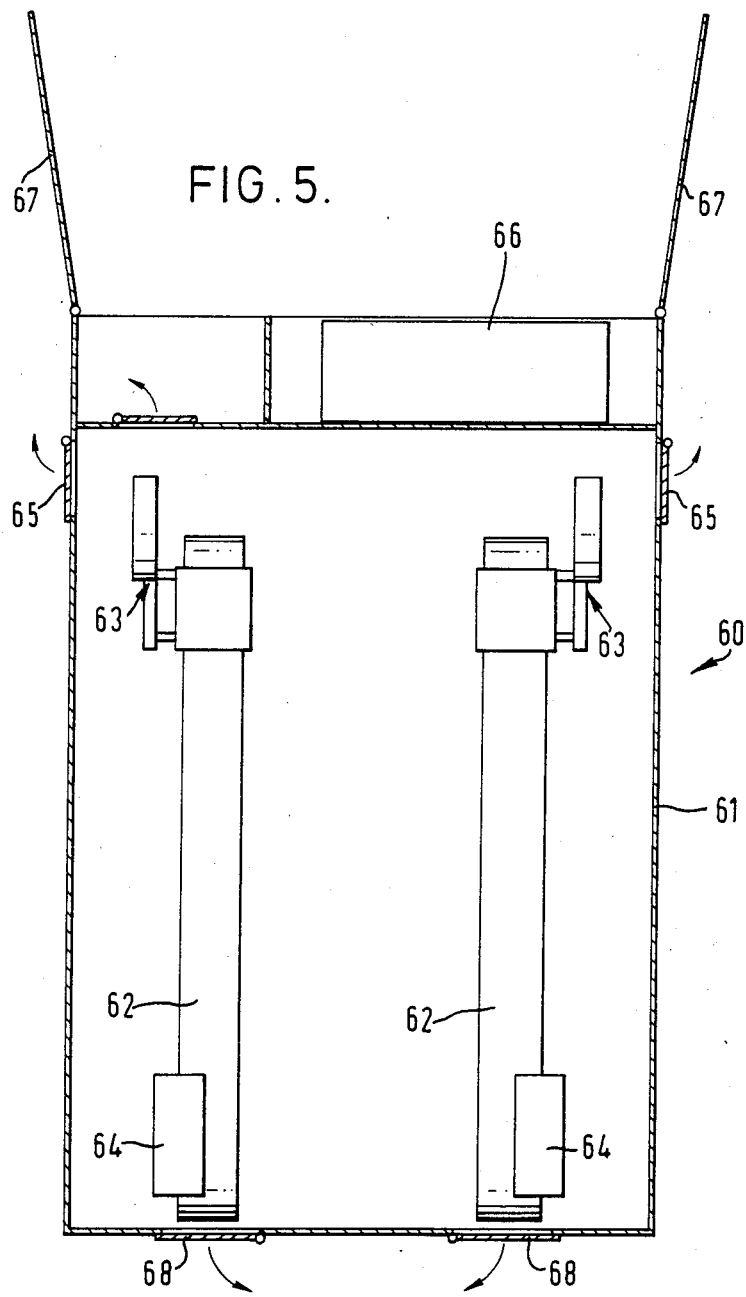

METHOD OF MATERIAL DISTRIBUTION AND APPARATUS FOR USE IN THE METHOD

This invention relates to an improved method of material distribution and to mobile bagging apparatus for use in the method.

At present, when free-flowing materials such as fertiliser and grain are transported overseas, the material is first bagged into predetermined bag sizes and then transported. This has two main disadvantages:
(i) the bags are not completely complimentary in shape so that more space is occupied than if the material were transported in bulk; and
(ii) the bags are susceptible to damage and therefore there are limits on loading so as to prevent the bags splitting.

However, with present distribution methods there are really no alternatives which will provide the material producers with the product guarantees they require. By bagging the material before distribution the producers have complete control over the product and any damage to the material will only be sustained through mishandling. Thus, before distribution, the producers meter free-flowing material into bags, usually measured by volume, and then seal the bags by heat sealing and/or stitching ready for transportation.

An object of the present invention is to provide an improved method of material distribution which enables material to be transported in bulk.

According to the present invention there is provided a method of material distribution for distributing free-flowing material comprising the steps of transporting the material in bulk from a first location to a second location, siting a bagging apparatus at the second location, unloading the transported material into the bagging apparatus, and bagging the material ready for use.

Preferably, the method relates to overseas distribution where the material is transported in bulk in the hold of a transport vessel. Suitably, in such an arrangement, the bagging apparatus is a mobile bagging apparatus which is temporarily sited on the quay so that the material may be unloaded directly from the transport vessel into the bagging apparatus.

The bagging step may comprise metering the material into bags in predetermined quantities by weight, and closing the bags. In damp environments the bags may be polypropylene bags which are heat sealed and stitched. Otherwise, the bags, which may include an innerplastics lining and outer canvas cover, are simply stitched.

The invention also includes a bagging plant for bagging free-flowing material, the plant comprising means for metering the free-flowing material into bags, and means for sealing the filled bags, the bagging plant being readily movable from one bagging site to another bagging site.

Suitably the bagging apparatus comprises a plurality of interlocking sections each section being of standardised transportable container dimensions. Alternatively, the bagging apparatus may comprise a single container adapted to receive free-flowing material for metering into the bags.

A preferred bagging unit comprises at least one transportable container, means defining a receiving hopper for receipt of the free-flowing material, valved outlet means from the hopper, and two parallel bagging runs each including a weighing and bagging machine arranged to receive a controlled quantity of material via the valved outlet means, stitching means for closing the filled bags, and a conveyor for moving the filled bags from the weighing and bagging machine to the stitching means and ready for use.

The invention will now be described by way of example with reference to the accompanying drawings in which:

FIG. 4 is a sectional side elevation of the bagging unit shown in FIG. 3 on 4—4 in FIG. 3

FIG. 5 is a diagrammatic plan view on 5—5 in FIG. 6 showing an alternative bagging unit;

Figure 1:
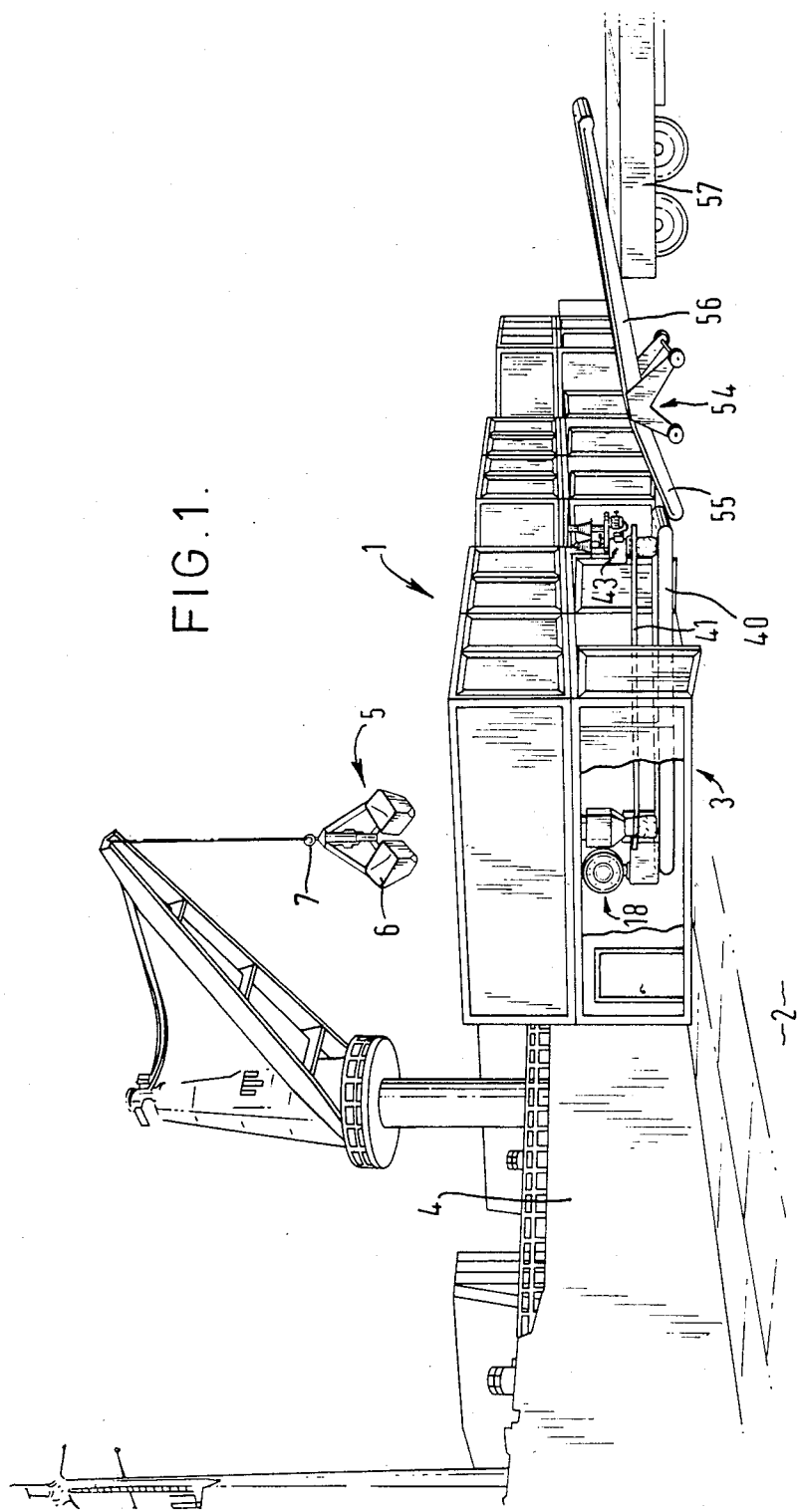
FIG. 1 is a perspective view of a bagging plant comprising a plurality of a first embodiment of bagging unit in use in accordance with the invention.

In FIG. 1 of the drawings a mobile bagging plant 1, for bagging free-flowing material such as fertilisers, is shown located on a port quay 2. The bagging plant 1 illustrated comprises three bagging units 3 each of which are positioned for receiving free-flowing material from a docked transport vessel 4.

The material is moved from the docked vessel 4 to the bagging plant 1 by means of a mechanical grab 5 having two scoops 6 pivoted at 7 and arranged so that they may be opened and closed by means of mechanical levers as desired. The scoops 6 have covered tops so as to deter spillage—the grab may be known construction and therefore, further details are not provided.

Figure 2:
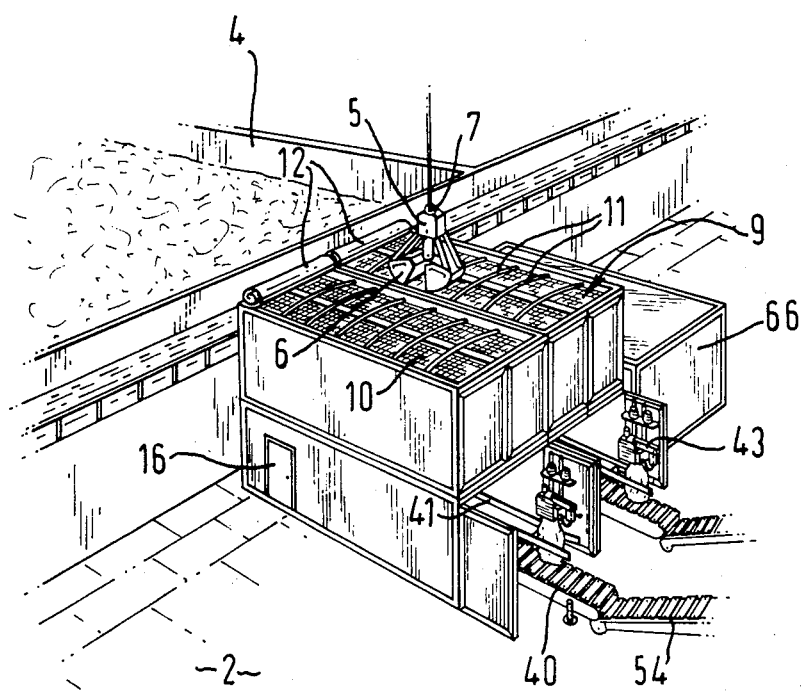
FIG. 2 is a perspective view from above of a bagging unit shown in FIG. 1 and showing its separate power pack container.

A bagging unit 3 of the first embodiment (see FIGS. 2, 3, 3A and 4) comprises four container sections 8 of standard transportable container dimensions and a power pack container 66. The four container sections 8 are strengthened along their edges for transport and may be locked together in the arrangement shown; namely two upper containers and two lower containers, by suitable fastening means (not shown). The upper containers 8 have an open top 9 which is covered by grating 10 and includes a plurality of roof bow members 11. The roof bow members 11 provide support for a removable tarpaulin or like material roof covering 12 (FIG. 2). The inside of the upper containers 8 include a sloping partition 13 defining a hopper inclined downwardly towards a substantially centrally disposed outlet 14.

The lower containers 8 of the bagging unit 3 each have an openable pair of end doors 15 and an access door 16 formed in the side wall. The lower containers 8 each retain a bagging and weighing machine 17 which is positioned below the outlet 14 from the respective upper container.

Figure 3:
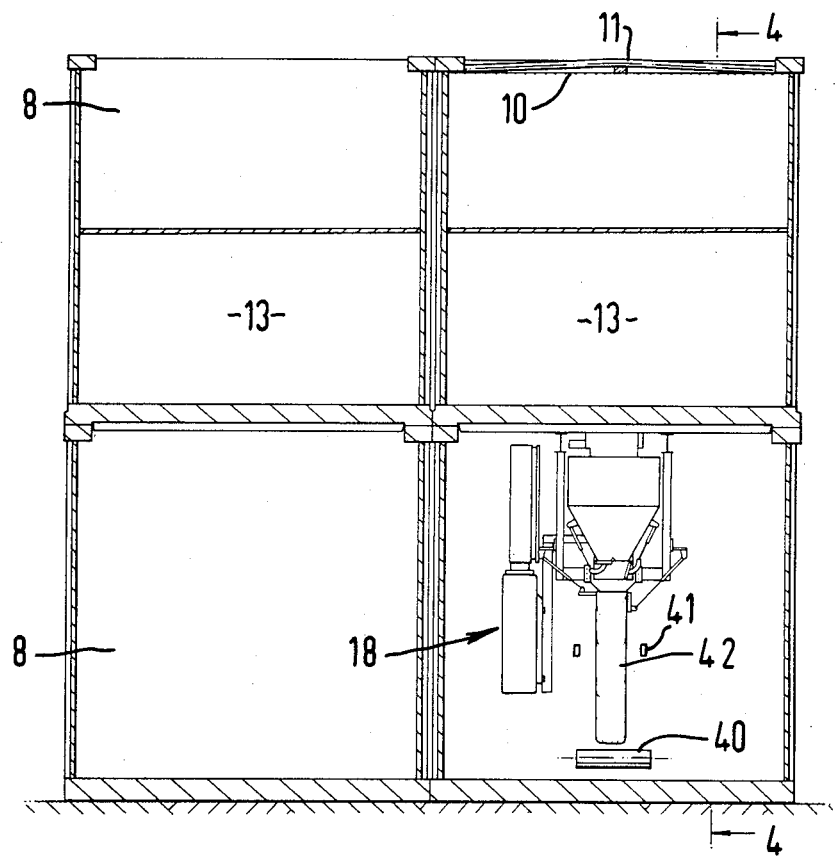
FIG. 3 is a sectional, partially diagrammatic, end elevation of a bagging unit (without the separate power pack container) on 3—3 in FIG. 4.
Figure 3A:
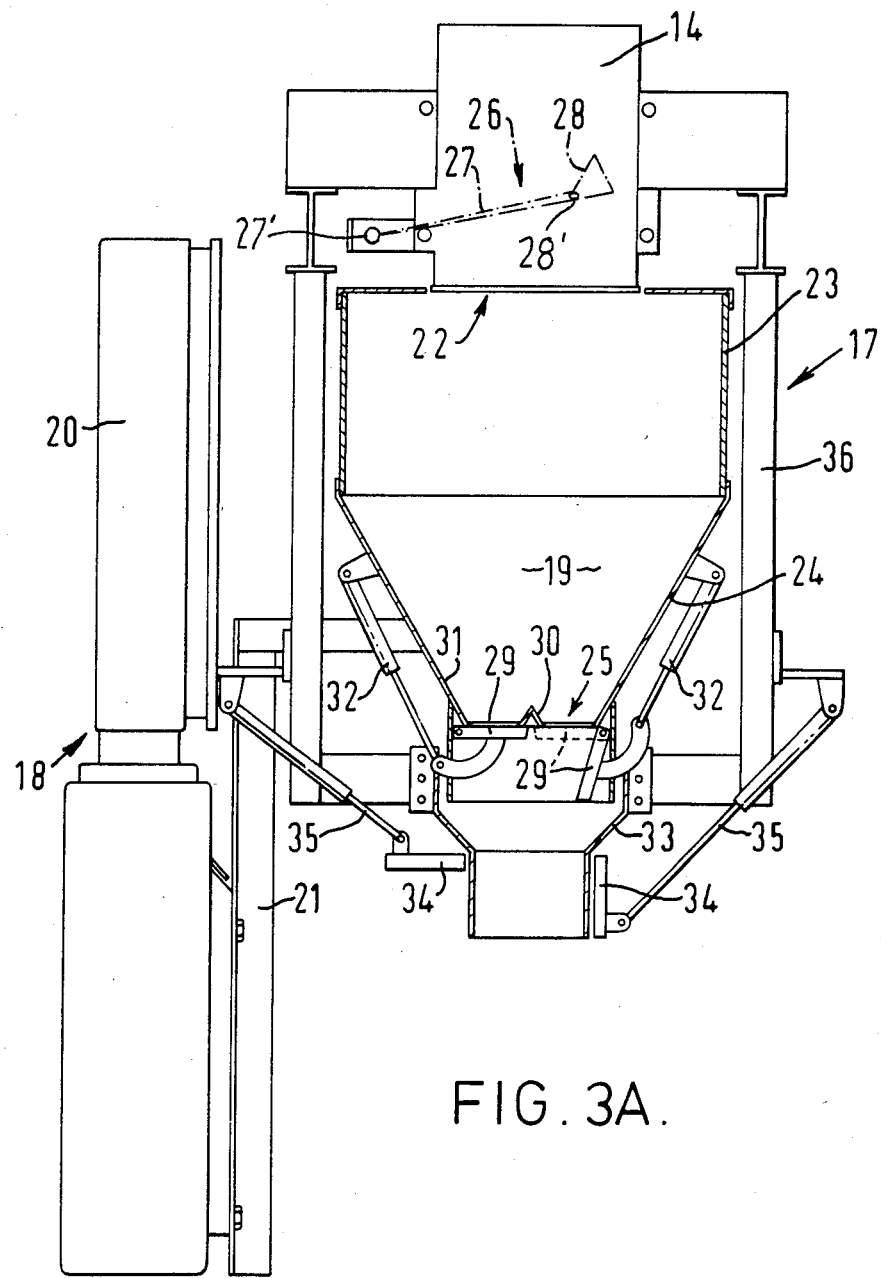
FIG. 3A is a detailed drawing of the weighing and bagging machine shown in FIG. 3.

The bagging and weighing machine 17 is shown in detail in FIGS. 3, 3A and 4 and comprises a standard weighing unit 18 of known construction mounted on a wall of one of the lower containers 8 and a weighing hopper 19. The machine has been modified to provide a unique design to ensure accuracy whilst avoiding spillage and jamming and those features which depart from conventional design have been shown in detail whereas the known features, which form no part of the present invention, have been omitted for clarity.

The standard weighing unit 18 includes a graduated scale 20 and a weighing support frame 21 on which the weighing hopper 19 is carried. The weighing hopper 19 is positioned below the outlet 14 but is free to move downwardly relative thereto on filling. It comprises an upper inlet 22, a transparent polycarbonate side wall 23, and a bottom wall 24 tapering towards a lower outlet 25.

The outlet 14 is normally closed by a valve means 26 including, shown diagrammatically, a first valve 27 to control free flow of material and a second valve 28 cooperating with a restricted opening defined by the first valve 27 for trickle flow for final weight adjustment. The lower outlet 25 consists of two flap valves 29 which close against a central member 30 and which are pivoted to the weighing hopper 19 beneath a depending extension 31 of the bottom wall 24. The position of the pivot points protects them against becoming jammed in use. The movement of the valves 27, 28 and 29 is effected by respective double-acting, hydraulic cylinders 32; only those for flap valves 29 being shown.

Suspended below the valved lower outlet 25 is a filling chute 33 having bag support clamps 34 pivotally mounted thereto as shown which are movable by means of double-acting hydraulic cylinders 35. The filling shute 33 is supported by means of a frame 36 extending downwardly from about the outlet 14 and which surrounds the weighing hopper 19.

Reverting to the standard weighing unit 18 it will be seen that this is provided with three controlling limit switches 37, 38 and 39. Switch 39 is a zero and is effective to ensure: closure of the flap valves 29 as shown to left in FIG. 3A, and release of the bag clamps 34 also as shown to the left in FIG. 3A. In this position the weighing machine may only be operated by a user clamping a bag on the filling chute 33 and actuation of a safety operation switch (not shown). This will then cause valves 27 and 28 to open so that material flows through outlet 14 into the weighing hopper 19 until the weight reaches limit switch 37. This switch causes closure of the valve 27 to reduce material flow as it approaches the desired weight. When switch 38 is tripped the valve 28 is closed stopping material flow completely and providing an accurate measured load whereupon the flap valves 29 are released to fill the bag clamped below.

In addition to the bagging and weighing machine 17 the lower containers 8 also each include a slatted endless conveyor 40 disposed beneath the machine and provided with lateral guides 41 so that, when filled, a bag 42 may be passed to a stitching station 43. the stitching station 43 includes a proprietory stitcherm suitably a DOBOY (Registered Trade Mark), which is activated automatically as each bag is fed into the machine. If desired, for example in damp environments a heat sealing station may be provided between the bagging station and the stitching station.

Figure 7:
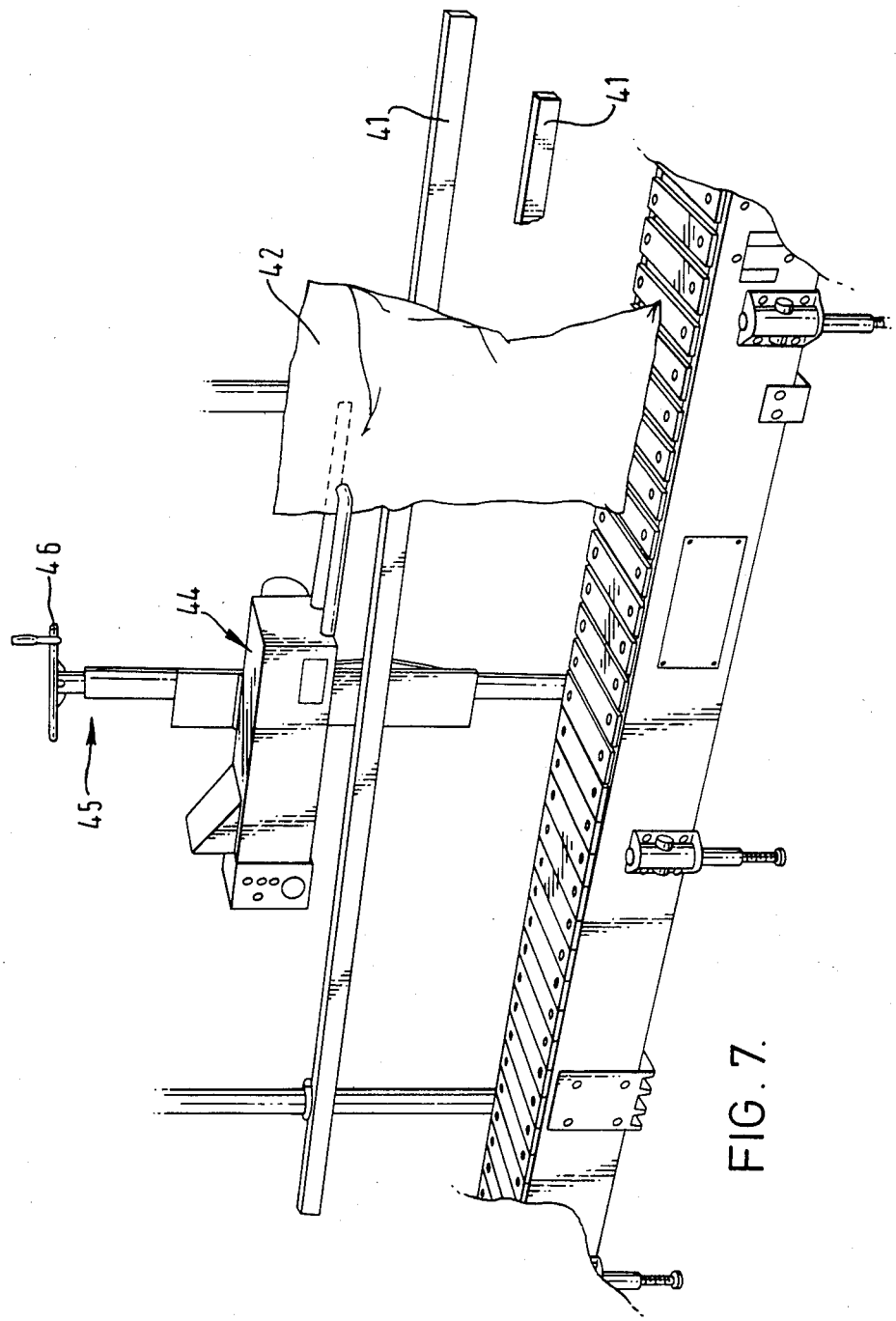
FIG. 7 illustrates an example of a heat sealing machine that may be used with the bagging unit of the present invention.

A preferred heat sealer illustrated by way of example in FIG. 7 is a proprietory heat sealer marketed by The Thames Packaging Equipment Company under the trade mark SAXON. The sealer 44 receives the mouth of the bag 42 as it passes along conveyor 40 sealing the mouth of the bag by the application of heat. The heat sealer 44 suitably may be height adjustable on a vertical pillar 45 by means of turn wheel 46.

Although a SAXON heat sealer and a DOBOY stitcher have been shown as an example it will be understood that any form of suitably heat sealing and stitching assembly may be used.

Outside of the container sections 8 it will be seen that the endless conveyors 40 feed the bags 42 to respective conveyor elevators 54. The elevators 54 have a first section 55 receiving bags 42 from the conveyors 40 and a second section 56 feeding the bags onto the transit vehicle 57. The first section 55 is preferably a plain conveyor although a slatted conveyor is illustrated in FIGS. 1 and 2: the second section 56 may be slatted or plain. In order to provide continuity of the process the second section 56 is angularly adjustable about two perpendicular axes so that it may vary its upwardly inclined attitude and slew from side to side, for example during the transition from loading one vehicle to loading another.

It will be seen from the above that each bagging unit includes constituent parts in duplicate. The reason for this is that the containers 8 are narrow in width and therefore, if two containers were not locked together, there would be a danger of free-flowing material spilling over the sides of a single container during supply of material to the bagging unit. Moreover there are preferably three units as shown in FIG. 1 to provide for fast bagging.

Figure 6:
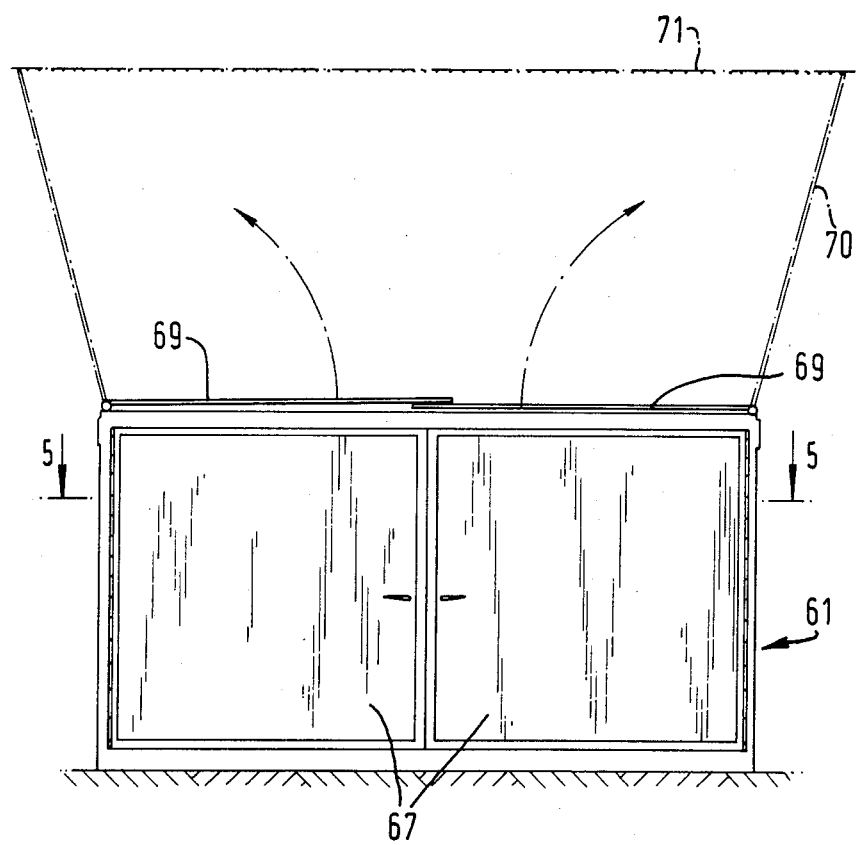
FIG. 6 is a diagrammatic view on arrow A in FIG. 5.

In FIGS. 5 and 6 an alternative embodiment is illustrated diagrammatically. In this second embodiment the bagging plant 60 comprises a single container 61 having parallel bagging runs 62 along each side. Each run consists of a weighing and bagging station 63 and a stitch station 64 with a sealing station therebetween if desired. The detail of the weighing and bagging machine and the stitching machine may be as shown and described in respect of the first embodiment. In addition the single container includes side access doors 65 for each run 62 and a rear generating station 66 accessible by means of openable end doors 67. So that the bagging runs 62 may be operated independently of one another each run extends to an individual openable end door 68.

As explained above, with a single container width, there is a danger of material spilling over the sides. In this second embodiment the material hopper is provided by side walls 69 which are hinged to the top of the container 61 and are movable to a position indicated by dotted lines 70 by means of hydraulic cylinders (not shown). In order to close the gaps between adjacent side walls 69 each side wall is provided with a hinged flap which overlaps the adjacent side wall and is held against the said side wall by the pressure of the material within the hopper. The grating of the first embodiment suitably is replaced by a nylon mesh indicated by dotted line 71 and a tarpaulin may be provided if desired.

In use, in either embodiment, a contract is obtained and then, rather than shipping material already bagged, the material is loaded in bulk into a bulk transport vessel for transportation to the nearest, or most convenient port, for the required destination. The advantage of bulk transit is that much more material can be handled since, with material that has already been bagged, more space is occupied and there are restrictions on loading in order to prevent bag breakage. At the same time a mobile bagging plant in accordance with the invention is transported to the port in question for assembly on the quay just prior to the arrival of the transportation vessel. The bulk material is then unloaded from the vessel by means of one or more grabs 5 which deposit the free-flowing material into the receiving hoppers of the bagging units: in the first embodiment the grab may be provided in the power pack container 48. The material flows from the receiving hopper, through respective valve controlled outlets 14, to the bagging and weighing machines 17. Once the weighing hopper is full, the valved outlet 14 is closed, the flap valves 29 opened to fill the bag, the full bag passed for stitching and heat sealing if necessary and then a new bag suspended for filling. The full bags are then loaded onto waiting vehicles for transportation to their destination at a rate of about six bags per minute; approximately the same rate as it would take to unload ready bagged material.

If the weather turns bad during unloading the hatches on the transportation vessel would be closed and tarpaulins placed over the material loading hopper. Bagging is then continued until the supply of free-flowing material retained in the hopper is exhausted. The bagging units of the present invention are provided with their own generators so that the units are totally self-sufficient these may either be separate units or part of the same unit.

Once unloading and bagging of the material has been completed the mobile bagging units are moved from the quay, in the case of the first embodiment disassembled and, if necessary, moved to another port where they are required. The standard container size of the modules of the bagging units means that the bagging units are readily transported by existing road, rail and sea methods.

We claim:

1. A mobile bagging plant for bagging free-flowing material in bags, comprising:
   at least one transportable module of standard shipping container dimensions and being readily movable from a first site to a second site, said module being compatible with other like standardized containers so that said module is stackable on and among said other like containers; and
   a bagging apparatus housed in said module, said bagging apparatus including
   an inlet means for receiving the material and closable by a first valve means,
   weighing means including a receptacle having an inlet and an outlet, and means for measuring the weight of the material within the receptacle, said inlet of said receptacle being positioned to receive material from said inlet means,
   second valve means for closing said outlet,
   bag retention means for positioning bags under said outlet of said receptacle when said second valve means is opened and for removing the bags after the bags have been filled,
   control means for closing said first valve means and then opening said second valve means when the weight of the material in said receptacle reaches a predetermined weight such that predetermined weights of material are fed into the bags from said receptacle, and
   closure means for closing the bags after filling.

2. A bagging plant according to claim 1 wherein the plant comprises a plurality of interlocking modules, each said module being of standard transportable shipping container dimensions.

3. A bagging plant according to claim 1 wherein said closure means comprises a stitching machine.

4. A bagging plant according to claim 2 wherein the plant comprises two lower and two upper interlocked modules, said two upper modules defining a material receiving hopper.

5. A bagging plant according to claim 1 wherein said module comprises a plurality of flaps hingedly connected to a top end thereof, said flaps being extendable to define a receiving hopper for material for subsequent delivery to said inlet means.

6. A bagging plant according to claim 4 wherein two parallel bagging runs with respective conveyors extending between a weighing and bagging station and a stitching station are housed in said modules.

7. A method of distributing free-flowing material, comprising the steps of:
   transporting free-flowing material in bulk and a bagging apparatus with weighing means and housed in at least one transportable module of standard shipping container dimensions from a second location to a first location, said module being compatible with other like standardized containers so that said module is stackable on and among said other like containers;
   siting said bagging apparatus at said first location;
   supplying the material to the bagging apparatus;
   weighing the material into batches of predetermined weight in said receptacle;
   positioning bags to receive the batches from said receptacle; and
   delivering the batches of material into the bags.

8. A method according to claim 7 wherein the bags are closed by stitching at a stitching station spaced from a bagging station at which material is metered into bags.

* * * * *